Nov. 25, 1958 G. W. EUERLE 2,861,612
CUTTER BIT CONSTRUCTION
Filed May 28, 1956
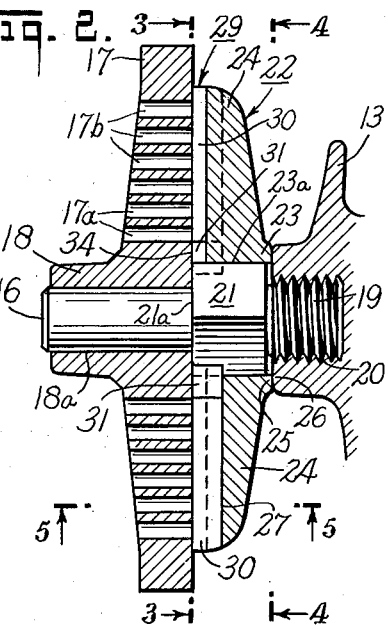
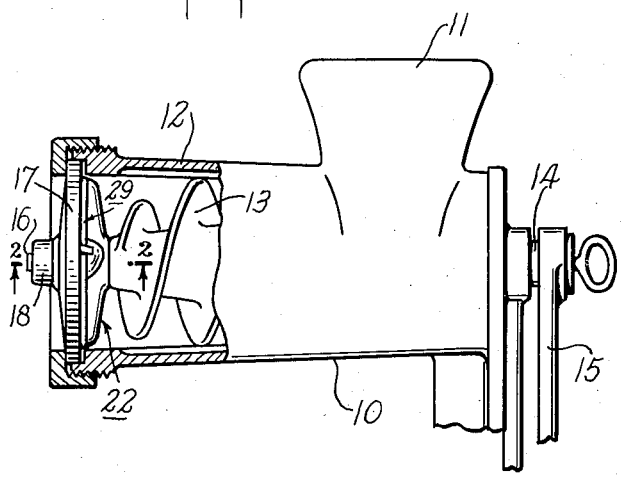
INVENTOR
George W. Euerle
BY
J. F. Basseches
his ATTORNEY

United States Patent Office 2,861,612
Patented Nov. 25, 1958

2,861,612

CUTTER BIT CONSTRUCTION

George W. Euerle, Oradell, N. J., assignor to Atlantic Service Company, Inc., Brooklyn, N. Y., a corporation of New York Application May 28, 1956, Serial No. 587,670

5 Claims. (Cl. 146—189)

This invention relates to food choppers, and more particularly to a cutting bit construction for the cutting knives therefor.

My invention concerns itself with the class of food choppers; more particularly, meat choppers wherein a generally cylindrical tubular casing is provided with a fill hopper at one end, through which the material to be chopped is guided in contact with a powerized feed screw conveyor axially rotatable in the casing to project and extrude meat or like food stuff toward the trailing end of the screw in the direction of a perforated cutter plate, where the food is cut by a rotary cutter and discharged.

In such assembly, the rotary cutter comprising a frame having cutting bits is keyed to rotate with a stud portion at the trailing end of the feed screw. The bits of said cutter frame actively bear against the perforated plate during rotation of the screw to shear the food stuff, particularly meat, as it becomes extruded through the perforations of the cutter plate. An example of such an assembly is shown in the patent to C. R. Williams, No. 2,636,530, April 28, 1953. In this latter patent, and others known to me, the cutter plate includes a bearing in which a trunnion portion, axially extended from the feed screw, rotates. The interiorly faced area around the bearing of such an assembly is continuous, or more sparsely formed with perforations as compared with the discontinuous cutter surface of the plate in which the perforations are formed.

Known to me is the attempt to minimize the accumulation of uncut meat, sinews or mashed meat adjacent the stud supporting bearing by extending the stud substantially flush with the end thrust surface of the cutter plate around the stud bearing, and co-terminously extending the cutter bits over the end thrust bearing surface about the stud. Such efforts to overlap or co-terminously extend the bits with the end thrust bearing surface of the cutter plate have been ineffective to prevent objectionable operation after accumulation of uncut meat. This defect, tending to cause the accumulation of mashed meat, entwined sinews or both, between the cover and the perforated plate and about the stud, may be explained by what I believe to be the formation of a gap and a variable contact between the cutting bits and the perforated plate, which I believe is due largely to uneven wearing down of the contacting surfaces of the bits and cutter plate. Thus, where the endeavor is made to contact and overlap the continuous end thrust and more sparsely provided perforated surfaces adjacent the trunnion bearing, as well as the perforations in the perforated plate, radially outwardly toward the periphery of the cutter plate simultaneously, the outer peripheral portions of the bit surfaces exhibit wear at a different rate than the areas adjacent the axial portion of the cutter plate, thereby to provide a variable gap, with the consequent imperfect grinding and the accumulation of mashed meat.

In accordance with my invention, it is an object thereof to provide for use with a perforated cutter plate having continuous areas, and in a measure areas of unevenly distributed perforations, particularly adjacent the hub, a cutter assembly in which cutter bits extend over the continuous area and discontinuous perforated area whereby the higher rate of wear in the outer contacting surface of blade and cutter plate is minimized, and to produce a substantially uniform rate of wear over the span of bits overlapping the continuous surface, as well as the discontinuous surface.

Still more particularly, it is an object of my invention to provide for use in a meat cutter having a perforated cutter plate with a continuous axial end thrust bearing surface, a rotary cutter having radially extending cutter bits overlapping the perforated area and continuous area, in which the contacting area of bits and cutter plate includes provision for substantially uniform and even wear along the radial length of the bits by making the elements in contact with each other extending adjacent to and over the continuous surface, of softer metal or of lesser abrasion resistance than those in contact with each other at the discontinuous portion of the cutter plate, whereby undesirable gaps are avoided.

This relationship I accomplish by providing in a cutter assembly having radially extended bits, dissimilarly wearing surfaces so that the bit of each has the inner or axially adjacent portions of softer metal or material of less abrasion resistance than the more peripherally extended sections whereby the rate of wear or abrasion at the axial portions progresses at a rate substantially similar to the rate of wear at the outer ends.

Still more particularly, it is an object of my invention to provide, especially in a self-sharpening meat grinder knife having the bit elements thereof adjacent the axial portion of relatively soft metal, as compared with the bit metal adjacent the more radially extended portions, the relationship in hardness of the different bit elements to each other effecting substantially uniform wear over the length of the bits, thereby to maintain a relatively uniform contact between the knife and the perforated cutter plate, for highly increased and longer lasting efficient meat grinding operations.

To attain these objects and such further objects as may appear herein or be hereinafter pointed out, I make reference to the accompanying drawing, forming a part hereof, in which—

Figure 1 is a side elevation, partly in section, of a meat grinder showing a knife assembly in accordance with my invention;

Figure 2 is a magnified partial fragmentary sectional view taken on the line 2—2 of Figure 1;

Figure 3 is a section taken on the line 3—3 of Figure 2;

Figure 4 is a section taken on the line 4—4 of Figure 2;

Figure 5 is a fragmentary section taken on the line 5—5 of Figure 2, further magnified;

Figure 6 is a perspective view of the bit elements.

Making reference to the drawing, there is disclosed a known representative type of meat or food chopper or grinder 10, having the usual fill hopper 11 leading to the tubular casing 12, within which the feed screw 13 rotates and which comprises a shaft 14 on one end, to which a handle lever 15 is connected, to supply the motive power, it being understood that a gear or belt may be substituted for the handle and may be connected to some motorized driving means, where manual means are not employed. The screw 13 has its shaft end 16 rotatably supported in the perforated cutter plate 17, in which is formed a bearing 18 to receive the shaft end 16, the bearing being on an extended portion of the cutter plate 17 by forming the same with a boss 18a.

In the illustration, the shaft end 16 may be integrally formed with the screw 13. Preferably, however, the shaft end 16 forms part of a stud 19 which is formed with a screw-threaded end engaging the threaded boring 20. The stud 19 is formed with a keyed or squared segment 21, to make positive connection with a cutter frame 22 whose hub 23 is formed with an aperture conforming to the keying segment 21 of the stud.

The cutter frame 22 is provided with radial arms 24. Adjacent the hub 23, an axial keying boring 23a corresponds to the contour of the keying segment 21 previously described as formed on the stud 19. The frame has a thrust or pressure face 25 at its leading edge for contact with the edge 26 of the screw 13. The trailing end, which constitutes the front face of the frame, is formed on the arms 24 with grooves 27. The grooves 27 are non-radially positioned along the length of the arms 24 and are pitched to provide positive angular rake. The slots 27 extend for the full length of the arms 24, and co-terminate with the side walls 28 defining the keying boring 23a.

The frame so formed is arranged to receive cutter blade bits 29 (see Figure 6), each of which has a segment 30 of a length to extend over the face of the cutter plate 17 to overlap the perforations which radially extend from the most axial group 17a to the most peripheral group 17b and an axial segment 31 which is preferably arranged to extend to have its end 32 co-terminous with the wall 28, previously described. The taper of the edge 32 accordingly conforms to the square segment 21 of the stud. The segment 31 extends radially at the portion 33 to span the end thrust surface 34 of the outer plate 17. Cutter bits thus provided are segmented for selective abrading resistance, and may be made so that the segment contacting the area between the innermost group of perforations, 17a, to the outermost group of perforations 17b, is of a relatively hard steel or hard steel alloy, whereas the segment 31 spanning the continuous end thrust surface 34 is made of a relatively mild steel.

The section 30 which I have found desirable is a steel which has a relative hardness of 48 to 58 on the Rockwell hardness scale C. The section 31 may be made of a mild steel which has a relative hardness of 6 to 8 on the Rockwell hardness scale C. Plural part sections may be utilized where the abrading resistance of the perforated section is found to be of non-uniform distribution of the perforations and this especially may occur adjacent the axial portion where the pattern of the perforations is not uniformly distributed radially and concentrically.

Knife bits thus made are affixed in the grooves or slots 27 formed in the arms and hub of the frame 22 previously described, as by known methods, permanently or temporarily to hold the blade bits within the slots. Soldering or brazing may be employed where removability of the bits within the frame 22 is found desirable. Welding may be employed where permanent affixing is preferred.

The bits 29, when combined with the frame 22, expose the cutting edges 34a to contact the lands 35 of the cutter plate with positive rake, providing in the embodiment illustrated a self-sharpening cutter assembly over the area extending from the continuous end thrust bearing surface 34 to the periphery beyond the group or perforations 17b.

In operation, the abrasive action of the discontinuous surface of the cutter plate in relation to the blade bits 29 as compared with the frictional action of the more or less continuous end thrust surface 34 will influence the wear or abrasion effect of the bits in accordance with the resistance of the bits. Accordingly, with the plural segments bits which I have described, the harder and more abrasive resistant segment of the bits will tend to resist abrasion and be worn down at relatively the same rate as the axially adjacent segments 31 of milder character or lesser abrasion resistance.

The plural part construction distributed in accordance with the abrading characteristics of the cutter plate which it contacts maintains relatively constant contact over the entire area that is spanned by the bits, to minimize the formation of gaps of higher magnitude adjacent the periphery of the arms 24 than at the axial portion.

Where, as in the embodiment illustrated, the stud shaft has the key portion 21 extensible so as to have the abutting end 21a in contact with the end thrust face 34, entwining of sinews about the stud shaft 16 is thereby further effective minimized, if not entirely eliminated.

It will likewise be understood that by making the bits 29 to extend into the end thrust bearing surface 34 with the milder or softer metal adjacent the most axially disposed row of perforations 17a, endwise support as well as substantially uniform abrasion resistance of the contacting surface of the bits are secured.

It will be understood that while I have described and illustrated plural part bits 29 having differential hardness segments 30 and 31, preferably extending the segments 31 for contact over the continuous end thrust bearing surface 34, those portions of the bit which overlap intermediate areas of a different length of abrasive action for each revolution in that the bits may cover a sparser density of perforations, may have such intermediate portion hardened to a relatively intermediate degree of abrasion resistance. Thus, stratified radial displacement of the lands between the hub area which is uninterrupted and the periphery, which is discontinuous or interrupted, may be compensated for by a positioning of metal of abrasion resistance in accordance with the abrasive action of the cutter plate by reason of the relative distribution of the perforations to the lands. Accordingly, my invention, in its broadest aspect, is the provision of a cutter wherein the cutter plate contacting portions have a relationship of hardness and wear resistance located with regard to the abrasion characteristics of the perforated plate.

Having thus described my invention and illustrated its use, what I claim as new and desire to secure by Letters Patent is:

1. In a meat cutting device wherein the meat is chopped by the proximate rotation of a cutter blade assembly and a perforated plate in contacting engagement, and in which said plate has areas of lands, one portion of which has a radial displacement of lands of greater uninterrupted degree at one section than at another, each of which is arranged in stratified areas, the combination therewith of a cutter assembly comprising radially extended cutter bits which contact the stratified areas of the perforated plate during rotation, the bits having differential hardness along the radial length, the bits having segments of relatively harder abrading resistance extending over areas of higher abrasive magnitude, whereby substantially uniform wear resistance over the cutting length edge of the bits is maintained from the axial portion to the peripheral portion whereby gaps are avoided in the contact between the cutter blade and the plate.

2. A bit for use with a meat or like grinding machine, a component of which includes a perforated plate comprising a land segment and a smooth stud hole segment, said bit having a land contacting segment and a stud hole area contacting segment complementary to said plate, the latter stud hole area contacting segment of the bit being softer than the former segment, the wear distribution being substantially uniform in use, maintaining the gap over the contacting surface substantially uniform.

3. A bit for a meat or like grinding machine in accordance with claim 2 wherein the first segment is of the hardness magnitude of from 48 to 58 Rockwell scale "C" hardness, and the second segment is of 6 to 8 Rockwell scale "C" hardness.

4. In a bit cutter assembly for grinding meat or the like having a grinder including a cutter assembly and a perforated plate and a feed screw directing the cutter assembly against the perforated plate, in which the surface portion of the bit assembly has continuous and perforated plate contacting areas which are radially spaced, said assembly comprising a frame having cutting bits mounted on the frame for contact with said areas, the cutter assembly having dissimilar bit portions for contacting the discontinuous area and the continuous area, the bit portion contacting the continuous area being softer than the bit portion contacting the perforated area whereby the rate of wear along the length of the bits will be maintained substantially constant and the formation of non-uniform gaps is avoided over the length of the composite bit portions.

5. In a meat cutting machine having a cooperating cylindrical body and screw feed for extruding the meat against a perforated cover plate having a land segment and stud hole segment, including a stud shaft extending through a bearing in said plate and a rotary cutter having a keying aperture complementary to portions on said shaft which are keyed for engaging said feed screw comprising radially extended arms having bits scanning the cutter plate in contact during rotation, and extending from said aperture outwardly, said bits having a land contacting segment and a stud hole area contacting segment co-terminous with the keying aperture, the segments adjacent the keying aperture being softer and less abrasive resistant than the portions spaced from said aperture, the wear distribution being substantially uniform, maintaining the gap between the plate and cover substantially uniform.

References Cited in the file of this patent

UNITED STATES PATENTS

| | | |
|---|---|---|
| 2,335,249 | Hawkins | Nov. 30, 1943 |
| 2,679,874 | Schmidt | June 1, 1954 |

FOREIGN PATENTS

| | | |
|---|---|---|
| 685,821 | Germany | Jan. 11, 1940 |